US011234150B2

(12) United States Patent
Tang

(10) Patent No.: US 11,234,150 B2
(45) Date of Patent: Jan. 25, 2022

(54) WIRELESS COMMUNICATION METHOD, TERMINAL DEVICE, AND NETWORK DEVICE

(71) Applicant: Guangdong OPPO Mobile Telecommunications Corp., Ltd., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 161 days.

(21) Appl. No.: 16/488,836

(22) PCT Filed: Feb. 28, 2017

(86) PCT No.: PCT/CN2017/075243
§ 371 (c)(1),
(2) Date: Aug. 26, 2019

(87) PCT Pub. No.: WO2018/157297
PCT Pub. Date: Sep. 7, 2018

(65) Prior Publication Data
US 2021/0136611 A1 May 6, 2021

(51) Int. Cl.
*H04W 24/10* (2009.01)
*H04L 5/00* (2006.01)
*H04W 72/04* (2009.01)

(52) U.S. Cl.
CPC ............ *H04W 24/10* (2013.01); *H04L 5/003* (2013.01); *H04L 5/0037* (2013.01); *H04L 5/0057* (2013.01); *H04W 72/042* (2013.01)

(58) Field of Classification Search
CPC .. H04W 24/10; H04W 72/042; H04L 5/0057; H04L 5/0037; H04L 5/003
See application file for complete search history.

(56) References Cited

U.S. PATENT DOCUMENTS 9,060,283 B2 * 6/2015 Ko ........................ H04L 5/001
9,271,283 B2 * 2/2016 You ...................... H04W 24/10
(Continued)

FOREIGN PATENT DOCUMENTS

CN 102624494 A 8/2012
CN 102740447 A 10/2012
(Continued)

OTHER PUBLICATIONS

Canadian Office Action for Application No. 3054451 dated Oct. 14, 2020.
(Continued)

*Primary Examiner* — Brian T O Connor
(74) *Attorney, Agent, or Firm* — Young Basile Hanlon & MacFarlane, P.C.

(57) ABSTRACT

A wireless communication method, a terminal device, and a network device are provided. The method includes: a terminal device receives an activation signaling sent by a network device, wherein the activation signaling is used for activating the terminal device to persistently report first CSI; the terminal device reports persistently the first CSI to the network device after receiving the activation signaling until the terminal device receives a deactivation signaling sent by the network device, wherein the deactivation signaling is used for instructing the terminal device to stop reporting the first CSI.

24 Claims, 4 Drawing Sheets

(56) References Cited

U.S. PATENT DOCUMENTS

| | | | | |
|---|---|---|---|---|
| 9,572,060 | B2* | 2/2017 | von Elbwart | H04L 5/003 |
| 9,887,824 | B2* | 2/2018 | Kim | H04L 27/0012 |
| 10,985,891 | B2* | 4/2021 | Bagheri | H04L 5/0051 |
| 2019/0199420 | A1* | 6/2019 | Faxer | H04B 7/0632 |
| 2020/0178220 | A1* | 6/2020 | Kang | H04W 24/10 |
| 2021/0084640 | A1* | 3/2021 | Kang | H04L 5/0048 |

FOREIGN PATENT DOCUMENTS

| | | |
|---|---|---|
| CN | 103546207 A | 1/2014 |
| CN | 103716078 A | 4/2014 |
| CN | 104885499 A | 9/2015 |
| CN | 105450332 A | 3/2016 |
| CN | 105991220 A | 10/2016 |
| CN | 106160934 A | 11/2016 |
| EP | 2475127 A1 | 7/2012 |
| EP | 2582075 A2 | 4/2013 |
| EP | 2919506 A1 | 9/2015 |
| EP | 3125456 A1 | 2/2017 |
| RU | 2504904 C2 | 1/2014 |
| RU | 2573578 C2 | 1/2016 |
| RU | 2581037 C2 | 4/2016 |
| RU | 2600569 C2 | 10/2016 |
| WO | 2011137177 A1 | 11/2011 |
| WO | 2011160448 A1 | 12/2011 |
| WO | 2014019168 A1 | 2/2014 |
| WO | 2014071638 A1 | 5/2014 |
| WO | 2015147592 A1 | 10/2015 |
| WO | 2016159623 A1 | 10/2016 |

OTHER PUBLICATIONS

Chile Office Action and English Translation for Application No. 2019-002448 dated Sep. 16, 2020.
Singapore Written Opinion for Application No. 1120190783V dated Nov. 10, 2020.
English Translation First Russian Office Action dated Jul. 28, 2020 from Application No. 2019129567.
EPO Examination Report dated Jul. 17, 2020 from Application No. 17899174.1.
3GPP TSG RAN WG1 Meeting #88; R1-1702455; Athens, Greece Feb. 13-17, 2017.
3GPP TSG RAN1 #88; R11703566; Athens, Greece, Feb. 13-17, 2017; Agenda Item: 8.1.2.3.5.
3GPP TSG RAN1 #88; R1-1703570; Athens, Greece, Feb. 13-17, 2017; Agenda Item: 8.1.2.3.5.
English Translation Chinese Office Action for Chinese Patent Application No. 201780087228.0 dated Jun. 2, 2020.
Extended EP Search Report for EP Appl No. 17899174.1 dated Nov. 11, 2019.
3GPP TSG-RAN WG2 Meeting #97; R2-1701829; Athens, Greece; Feb. 13-17, 2017.
English Translation of Chinese Office Action for Chinese Patent Application No. 201780087228.0 dated Mar. 11, 2020.
Japanese First Office Action with English Translation for JP Application 2019-546390 dated Mar. 19, 2021. (6 pages).
India First Examination Report for IN Application 201917033983 dated Feb. 9, 2021. (7 pages).
LG Electronics, Discussion on CSI timing, 3GPP TSG RAN WG1 NR Ad-Hoc Meeting, R1-1700473, Jan. 16-20, 2017. (7 pages).
ZTE, ZTE Microelectronics, Details of CSI framework, 3GPP TSG RAN WG1 Meeting#88, R1-1701806, Feb. 13-17, 2017. (11 pages).
Canadian Examination Report for CA Application 3054451 dated Aug. 16, 2021. (4 pages).
Chile Office Action with English Translation for CL Application 2019002448 dated Jun. 17, 2021. (49 pages).
Extended European Search Report for EP Application 21171745.9 dated Aug. 2, 2021. (15 pages).
Singapore Notice of Eligibility for Grant for SG Application 11201907837V dated Aug. 25, 2021. (6 pages).
Taiwan Office Action with English Translation for TW Application 107104400 dated Aug. 9, 2021. (18 pages).
Australian Examination Report for AU Application 2017401773 dated Nov. 4, 2021. (3 pages).
Indonesia Office Action with English Translation for ID Application P00201908474 dated Nov. 4, 2021. (10 pages).

* cited by examiner

WIRELESS COMMUNICATION METHOD, TERMINAL DEVICE, AND NETWORK DEVICE

CROSS-REFERENCE TO RELATED APPLICATION(S)

This application is a 371 application of International Application No. PCT/CN2017/075243, filed on Feb. 28, 2017, the entire disclosure of which is hereby incorporated by reference.

TECHNICAL FIELD

The present disclosure relates to the field of communication, and more particularly to a wireless communication method, a terminal device, and a network device.

BACKGROUND

In a Long Term Evolution (LTE) communication system, a terminal device may measure a channel state information reference signal (CSI-RS) sent by a network device to obtain channel state information (CSI).

Currently, a 5G communication system is being discussed. In the 5G communication system, how to realize feedback of the CSI to meet requirements for communication performance of the 5G communication system is an urgent problem to be solved.

SUMMARY

Implementations of the present disclosure provide a wireless communication method, a terminal device, and network device.

In a first aspect, a wireless communication method is provided. The method includes: a terminal device receives an activation signaling sent by a network device, wherein the activation signaling is used for activating the terminal device to persistently report first channel state information (CSI); and the terminal device reports persistently the first CSI to the network device after receiving the activation signaling until the terminal device receives a deactivation signaling sent by the network device, wherein the deactivation signaling is used for instructing the terminal device to stop reporting the first CSI.

In combination with the first aspect, in one possible implementation of the first aspect, reporting, by the terminal device, persistently the first CSI to the network device, includes: the terminal device reports persistently the first CSI to the network device through a physical uplink shared channel (PUSCH) or a physical uplink control channel (PUCCH).

In combination with the first aspect or any above possible implementation thereof, in another possible implementation of the first aspect, the first CSI includes at least one of: a channel state information reference signal resource indicator (CRI), a rank indicator (RI), a pre-coding matrix indicator (PMI), channel quality information (CQI), a quantized value of channel information, and a quantized value of interference.

In combination with the first aspect or any above possible implementation thereof, in another possible implementation of the first aspect, the method further includes: the terminal device performs persistent CSI measurement to obtain the first CSI.

In combination with the first aspect or any above possible implementation thereof, in another possible implementation of the first aspect, performing, by the terminal device, the persistent CSI measurement to obtain the first CSI, includes: the terminal device determines at least one of the following according to content included in the first CSI, and performs the persistent CSI measurement according to the at least one of the following to obtain the first CSI: a resource for performing the persistent CSI measurement, a quantity of channel state information reference signal (CSI-RS) ports used for performing the persistent CSI measurement, and an assumption of a CSI-RS transmission beam on the resource for performing the CSI measurement.

In combination with the first aspect or any above possible implementation thereof, in another possible implementation of the first aspect, reporting, by the terminal device, persistently the first CSI to the network device, includes: the terminal device determines a first time domain resource for reporting the first CSI for a first time according to content included in the first CSI; and the terminal device reports the first CSI for the first time on the first time domain resource.

In combination with the first aspect or any above possible implementation thereof, in another possible implementation of the first aspect, the activation signaling includes first information for indicating content included in the first CSI; reporting, by the terminal device, persistently the first CSI to the network device, includes: the terminal device reports persistently the first CSI to the network device according to the first information, wherein the first CSI includes the content indicated by the first information.

In combination with the first aspect or any above possible implementation thereof, in another possible implementation of the first aspect, the activation signaling includes second information for indicating time when the first CSI is reported for a first time; reporting, by the terminal device, persistently the first CSI to the network device, includes: the terminal device determines a second time domain resource for reporting the first CSI for the first time according to the second information, and reports the first CSI to the network device for the first time on the second time domain resource.

In combination with the first aspect or any above possible implementation thereof, in another possible implementation of the first aspect, the terminal device determines time domain resources for subsequent persistent reporting of the first CSI according to the second time domain resource for reporting the first CSI for the first time and a period obtained in advance for reporting persistently the first CSI.

In combination with the first aspect or any above possible implementation thereof, in another possible implementation of the first aspect, the activation signaling includes third information for indicating a resource for reporting the first CSI; reporting, by the terminal device, persistently the first CSI to the network device, includes: the terminal device reports persistently the first CSI to the network device on the resource indicated by the third information.

In combination with the first aspect or any above possible implementation thereof, in another possible implementation of the first aspect, reporting, by the terminal device, persistently the first CSI to the network device, includes: the terminal device reports persistently the first CSI to the network device on persistent time domain resource units for uplink transmission; or the terminal device reports the first CSI to the network device periodically with a certain period.

In combination with the first aspect or any above possible implementation thereof, in another possible implementation of the first aspect, reporting, by the terminal device, persistently the first CSI to the network device, includes: the terminal device determines the first CSI reported each time according to a dependency relationship among CSI measurement, and reports the first CSI.

In combination with the first aspect or any above possible implementation thereof, in another possible implementation of the first aspect, measurement for the first CSI reported each time does not depend on the first CSI reported at other times; or, the first CSI for which measurement has a dependency relationship, is reported on persistent reporting resources.

In combination with the first aspect or any above possible implementation thereof, in another possible implementation of the first aspect, the activation signaling includes fourth information for indicating a dependency relationship among measurement for the first CSI reported at various times.

In combination with the first aspect or any above possible implementation thereof, in another possible implementation of the first aspect, reporting, by the terminal device, persistently the first CSI to the network device, includes: the terminal device reports persistently the first CSI to the network device by adopting at least one of: a same Multiple Input Multiple Output (MIMO) transmission mode, a same modulation coding manner, a same quantity of orthogonal frequency division multiplexing symbols, and a same frequency domain resource.

In combination with the first aspect or any above possible implementation thereof, in another possible implementation of the first aspect, the method further includes: the terminal device receives a first downlink control information (DCI) signaling for scheduling a transmission of uplink data; the terminal device determines according to the first DCI signaling that the transmission of the uplink data needs to be performed in a first time domain resource unit in which the first CSI is persistently reported; reporting, by the terminal device, persistently the first CSI to the network device, includes: the terminal device reports the first CSI to the network device in a way of multiplexing with the uplink data in the first time domain resource unit.

In combination with the first aspect or any above possible implementation thereof, in another possible implementation of the first aspect, the method further includes: the terminal device receives a second DCI signaling for scheduling aperiodic CSI reporting; the terminal device determines according to the second DCI signaling that the aperiodic CSI reporting needs to be performed in a second time domain resource unit in which the first CSI is persistently reported; the method further includes: the terminal device performs the aperiodic CSI reporting based on the second DCI signaling, and suspends persistent reporting of the first CSI in the second time domain resource unit.

In combination with the first aspect or any above possible implementation thereof, in another possible implementation of the first aspect, the activation signaling and deactivation signaling are a DCI signaling or a media access control (MAC) signaling.

In a second aspect, a wireless communication method is provided. The method includes: a network device sends an activation signaling to a terminal device, wherein the activation signaling is used for activating the terminal device to persistently report first channel state information (CSI); the network device receives persistently the first CSI reported by the terminal device; and the network device sends a deactivation signaling to the terminal device and stops receiving the first CSI, wherein the deactivation signaling is used for instructing the terminal device to stop reporting the first CSI.

In combination with the second aspect, in one possible implementation of the second aspect, receiving, by the network device, persistently the first CSI reported by the terminal device, includes: the network device receives persistently the first CSI through a physical uplink shared channel (PUSCH) or a physical uplink control channel (PUCCH).

In combination with the second aspect or any above possible implementation thereof, in another possible implementation of the second aspect, the first CSI includes at least one of: a channel state information reference signal resource indicator (CRI), a rank indicator (RI), a pre-coding matrix indicator (PMI), channel quality information (CQI), a quantized value of channel information, and a quantized value of interference.

In combination with the second aspect or any above possible implementation thereof, in another possible implementation of the second aspect, the method further includes: the network device obtains beam information of downlink beam-forming according to CRI when the first CSI includes the CRI; or, the network device schedules downlink data for the terminal device according to RI, PMI, and CQI when the first CSI includes the RI, the PMI, and the CQI; or, the network device schedules downlink data for the terminal device according to RI and CQI when the first CSI includes the RI and the CQI.

In combination with the second aspect or any above possible implementation thereof, in another possible implementation of the second aspect, the activation signaling includes at least one of first information, second information, third information, and fourth information, wherein, the first information is used for indicating content included in the first CSI; the second information is used for indicating time when the first CSI is reported for a first time; the third information is used for indicating a resource for reporting the first CSI; the fourth information is used for indicating a dependency relationship among measurement for the first CSI reported at various times.

In a third aspect, a terminal device is provided, which may include units for implementing the method in the first aspect or any possible implementation thereof.

In a fourth aspect, a network device is provided, which may include units for implementing the method in the second aspect or any possible implementation thereof.

In a fifth aspect, a terminal device is provided, which may include a memory and a processor. The memory stores instructions, and the processor is used for calling the instructions stored in the memory to perform the method in the first aspect or any optional implementation thereof.

In a sixth aspect, a network device is provided, which may include a memory and a processor. The memory stores instructions, and the processor is used for calling the instructions stored in the memory to perform the method in the second aspect or any optional implementation thereof.

In a seventh aspect, a computer readable medium is provided. The computer readable medium stores program codes executable by a terminal device, and the program codes include instructions for executing the method of the first aspect or the method in any one of the various implementations of the first aspect, or include instructions for executing the method of the second aspect or the method in any one of the various implementations of the second aspect.

In an eighth aspect, a system chip is provided, which includes an input interface, an output interface, a memory, and a processor. The processor is used for executing codes in the memory, and when the codes are executed, the processor may implement the methods in the first aspect and various implementations thereof, or execute the methods in the second aspect and various implementations thereof.

BRIEF DESCRIPTION OF DRAWINGS

To describe the technical solution of implementations of the present disclosure more clearly, accompanying drawings that need to be used in the description of implementations or the prior art will be briefly introduced below. It is apparent that the accompanying drawings described below are only some implementations of the present disclosure; and for a person of ordinary skill in the art, other drawings may be obtained according to these drawings without paying an inventive effort.

DETAILED DESCRIPTION

The technical solution in implementations of the present disclosure will be described below with reference to the drawings in implementations of the present disclosure. It is apparent that the implementations described are just some implementations of the present disclosure, but not all implementations of the present disclosure. According to the implementations of the present disclosure, all other implementations achieved by a person of ordinary skill in the art without paying an inventive effort are within the protection scope of the present disclosure.

The technical solution of the implementations of the present disclosure may be applied to various communication systems, such as, a Global System of Mobile communication (GSM) system, a Code Division Multiple Access (CDMA) system, a Wideband Code Division Multiple Access (WCDMA) system, a General Packet wireless Service (GPRS) system, a Long Term Evolution (LTE) system, a LTE Frequency Division Duplex (FDD) system, a LTE Time Division Duplex (TDD) system, a Universal Mobile Telecommunication System (UMTS) system, a Worldwide Interoperability for Microwave Access (WiMAX) communication system, or a future 5G system.

Figure 1:
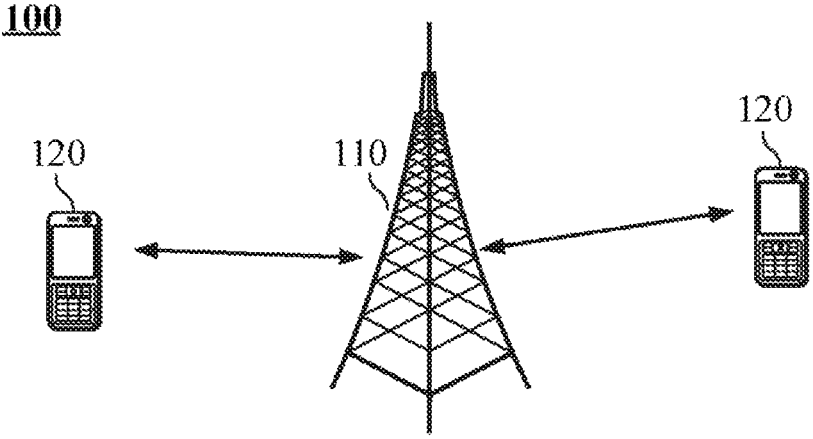
FIG. 1 is a schematic diagram of a wireless communication system according to an implementation of the present disclosure.

FIG. 1 shows a wireless communication system 100 to which an implementation of the present disclosure is applied. The wireless communication system 100 may include a network device 110. The network device 110 may be a device that communicates with a terminal device. The network device 110 may provide communication coverage for a specific geographical area, and may communicate with a terminal device (e.g., UE) in the coverage area. Optionally, the network device 110 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN). Or the network device may be a relay station, an access point, a vehicle-mounted device, a wearable device, a network side device in a future 5G network, or a network device in a future evolved Public Land Mobile Network (PLMN), etc.

The wireless communication system 100 further includes at least one terminal device 120 in the coverage area of the network device 110. The terminal device 120 may be mobile or fixed. Optionally, the terminal device 120 may be referred to as an access terminal, a User Equipment (UE), a subscriber unit, a subscriber station, a mobile station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal device in a future 5G network, or a terminal device in a future evolved Public Land Mobile Network (PLMN), or the like.

Optionally, the 5G system or network may also be referred to as a New Radio (NR) system or network.

FIG. 1 exemplifies one network device and two terminal devices. Optionally, the wireless communication system 100 may include multiple network devices, and another quantity of terminal devices may be included within the coverage area of each network device, which is not limited in implementations of the present disclosure.

Optionally, the wireless communication system 100 may further include other network entities such as a network controller, a mobile management entity, and implementations of the present disclosure are not limited thereto.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

Figure 2:
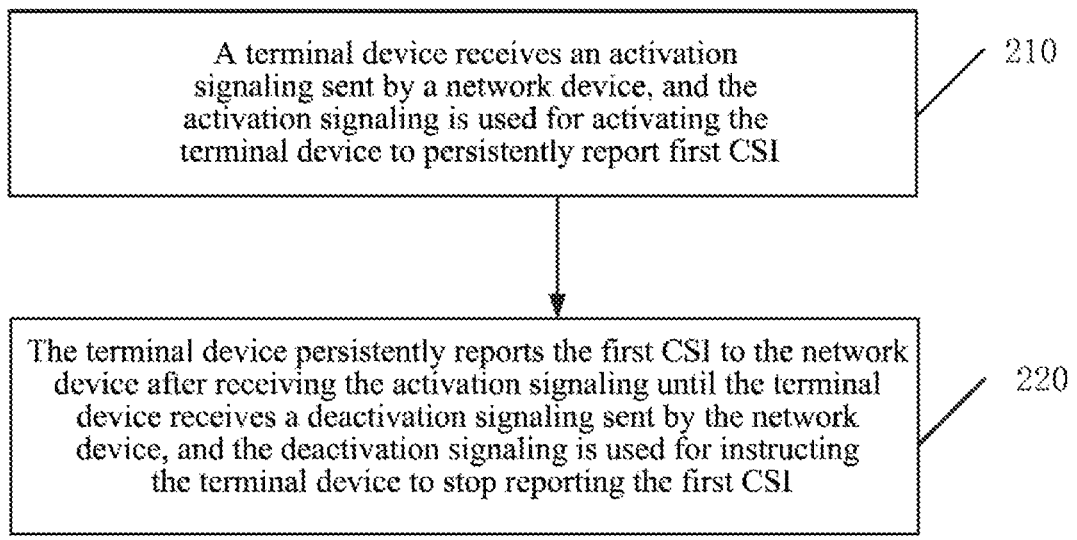
FIG. 2 is a schematic flowchart of a wireless communication method according to an implementation of the present disclosure.

FIG. 2 is a schematic flowchart of a wireless communication method 200 according to an implementation of the present disclosure. The method 200 may optionally be used in the wireless communication system 100 described above.

As shown in FIG. 2, the method 200 includes the following contents.

In 210, a terminal device receives an activation signaling sent by a network device, and the activation signaling is used for activating the terminal device to persistently report first Channel State Information (CSI).

Optionally, the activation signaling may be a Downlink Control Information (DCI) signaling or a Media Access Control (MAC) signaling.

In 220, the terminal device persistently reports the first CSI to the network device after receiving the activation signaling until the terminal device receives a deactivation signaling sent by the network device, wherein the deactivation signaling is used for instructing the terminal device to stop reporting the first CSI.

Optionally, the deactivation signaling may be a DCI or MAC signaling.

Optionally, the terminal device persistently reports the first CSI to the network device through a Physical Uplink Shared Channel (PUSCH).

Optionally, the terminal device persistently reports the first CSI to the network device through a Physical Uplink Control Channel (PUCCH).

More feedback information may be carried when persistent CSI reporting is performed through the PUSCH, especially under a condition of sufficient uplink resources.

Optionally, the terminal device uses the same transmission manner to persistently report the first CSI to the network device.

Wherein, the same transmission manner mentioned in the implementation of the present disclosure includes but is not limited to adopting at least one of: a same Multiple Input Multiple Output (MIMO) transmission mode, a same modulation coding manner, a same quantity of orthogonal frequency division multiplexing (OFDM) symbols, and a same frequency domain resource.

For example, a MIMO transmission mode with uplink transmit diversity may be adopted, and a lower modulation coding manner is adopted, thereby ensuring a reliability of the CSI.

Optionally, a fixed quantity of Physical Resource Blocks (PRBs) may be occupied, thereby saving the overhead of signaling configuration.

Optionally, the first CSI includes at least one of: a CSI-RS resource indicator (CRI), a rank indicator (RI), a pre-coding matrix indicator (PMI), channel quality information (CQI), a quantized value of channel information, and a quantized value of interference.

Optionally, the quantized value of channel information may be a quantized value of a channel covariance matrix, a quantized value of a channel feature vector, or a quantized value of channel estimation itself.

Optionally, the activation signaling includes first information for indicating content included in the first CSI; and the terminal device persistently reports the first CSI to the network device according to the first information, and the first CSI includes the content indicated by the first information.

Optionally, the first information is used for indicating one of:
CRI; or
RI, PMI, and CQI; or
CRI, RI, PMI, and CQI; or
RI and CQI; or
CRI, RI, and CQI.

The activation signaling may indicate the content needed to be included in the first CSI through a value(s) of a bit(s) included in the first information. For example, the first information may be 1 bit, and the value of the bit may indicate one of two types of CSI contents: {CRI, RI/PMI/CQI}. For example, when the value of the bit is 0, it indicates that the first CSI needs to include the CRI, and when the value of the bit is 1, it indicates that the first CSI needs to include the RI, PMI, and CQI.

Optionally, the value of the 1 bit may indicate one of the following two types of contents: {CRI, RI/PMI/CQI/CRI}, or the value of the 1 bit may indicate one of the following two types of contents: {CRI, RI/CQI}.

Optionally, the terminal device performs persistent CSI measurement to obtain the first CSI.

Herein, a resource for persistent CSI measurement may be a resource for periodical CSI-RS transmission.

Herein, the resource used for periodical CSI-RS transmission is usually a CSI-RS resource configured by a network device, and its configuration information may include a time domain offset, a period, etc. Therefore, a terminal device may perform a CSI measurement based on the resource used for periodical CSI-RS transmission according to the configuration information.

Optionally, the network device may indicate the resource for periodical CSI-RS transmission to the terminal device in advance through a high layer signaling or a DCI signaling.

For example, one CSI-RS resource may be indicated as a resource for performing the persistent CSI measurement from multiple CSI-RS resources configured by a MAC layer message or a Radio Resource Control (RRC) message through a DCI signaling.

Herein, one resource configuration may correspond to one CSI-RS resource, that is, the resource configuration of one CSI-RS resource among the multiple CSI-RS resources is different from that of other CSI-RS resources, for example, at least one of the time domain offset and the period may be different.

Optionally, if the CSI-RS resource for persistent CSI measurement includes multiple CSI-RS resources, the terminal device may assume that CSI-RS signals transmitted on the multiple resources use the same beam or use different beams. Or, if the CSI-RS resource for persistent CSI measurement contains only one CSI-RS resource, the terminal device may assume that different ports of CSI-RS signals transmitted on the resource use the same beam or use different beams. If the terminal device assumes that different beams are used, the first CSI needs to include a CSI-RS resource indicator (CRI).

Optionally, when persistent CSI measurements are performed, content of the first CSI obtained by each measurement may be different.

Optionally, different contents of CSI may be obtained from CSI-RS resources of different resource configurations, and may not be carried in one CSI reporting, or may be carried in one CSI reporting.

Optionally, different contents may be obtained from different time domain resource units of a CSI-RS resource of the same resource configuration, and may not be carried in one CSI reporting, or may be carried in one CSI reporting.

Optionally, the terminal device determines at least one of the following according to the content included in the first CSI, and performs persistent CSI measurement according to at least one of the following to obtain the first CSI: a resource for performing the persistent CSI measurement, a quantity of CSI-RS ports used for performing the persistent CSI measurement, and an assumption of a CSI-RS transmission beam on the resource for performing the persistent CSI measurement.

For example, if the first CSI only includes CRI, the terminal device needs to perform a CSI measurement based on multiple CSI-RS resources; if the content of the first CSI includes RI and CQI, or includes RI, PM, and CQI, the terminal device only needs to perform the CSI measurement based on one CSI-RS resource.

For example, if the first CSI only includes CRI, the terminal device needs the first 1 or 2 CSI-RS ports (port 0, or ports 0 and 1) of the resource for performing the CSI measurement to perform the CSI measurement; and if the first CSI includes RI and CQI, or includes RI, PMI, and CQI, the terminal device needs all CSI-RS ports on the resource for performing the CSI measurement to perform the CSI measurement.

For example, if the content of the first CSI only includes CRI, the terminal device assumes that different CSI-RS ports on a CSI-RS resource on which measurement is based adopt different transmission beams, thereby a CSI measurement is performed; and if the content of the first CSI includes RI and CQI, or includes RI, PMI, and CQI, the terminal device assumes that different CSI-RS ports on the CSI-RS resource on which the measurement is based adopt the same transmission beam.

Optionally, the terminal device determines a first time domain resource for reporting the first CSI for a first time according to the content included in the first CSI; and the terminal device reports the first CSI for the first time on the first time domain resource.

Optionally, the terminal device determines time domain resources for subsequent persistent reporting of the first CSI according to the first time domain resource for reporting the first CSI for the first time and a period obtained in advance for persistent reporting the first CSI.

Optionally, if the content of the first CSI reported every time is not always the same, the terminal device may determine a first time domain resource for reporting the first CSI for a first time according to the content included in the first CSI reported for the first time; and the first CSI is reported for the first time on the first time domain resource.

For example, if the first CSI reported for the first time only includes CRI, a shorter feedback delay may be adopted, for example, a difference between reception of an activation signaling and CSI feedback for the first time is 1 time slot.

For example, if the first CSI reported for the first time includes RI, PMI, and CQI, or includes RI and CQI, a longer feedback delay may be adopted, for example, a difference between reception of the activation signaling and the CSI feedback for the first time is 2 time slots.

For example, if the first CSI reported for the first time includes a channel covariance matrix or an interference covariance matrix, a much longer feedback delay is required. For example, a difference between reception of the activation signaling and the CSI feedback for the first time is 3 time slots.

Optionally, the activation signaling includes second information for indicating time when the first CSI is reported for a first time; and the terminal device determines a second time domain resource for reporting the first CSI for the first time according to the second information, and reports the first CSI to the network device for the first time on the second time domain resource.

Optionally, the terminal device determines time domain resources for subsequent persistent reporting of the first CSI according to the second time domain resource for reporting the first CSI for the first time and a period obtained in advance for persistently reporting the first CSI.

Optionally, in the implementation of the present disclosure, the second information may indicate the time for reporting the first CSI for the first time by indicating a timing relationship between reception of the activation signaling and reporting of the first CSI for the first time. Specifically, the timing relationship may be used for indicating a quantity of time resource units that differ between the time when the first CSI is reported for the first time and the time when the activation signaling is received, for example, a quantity of subframes or a quantity of time slots.

If contents of the first CSI reported for the first time are different, the timing relationships of the second information may be different. In other words, different timing relationships may be indicated by the same indication field, that is, timing relationships indicated by the same indication field are different for different CSI contents.

For example, as shown in Table 1 below, the indication field of the timing relationship may include two bits. Assuming that a value of the bits in the indication field is 01, it indicates that when the first CSI reported for the first time only includes CRI, the feedback delay N (i.e., a quantity of time domain resource units that differ between the time when an activation signaling is received and the time when the CSI is reported) is 1, and when the first CSI reported for the first time includes RI, PMI, and CQI, the feedback delay N is 2.

TABLE 1

| Indication field of a timing relationship | CRI | RI/PMI/CQI |
|---|---|---|
| 00 | N = 0 | N = 0 |
| 01 | N = 1 | N = 2 |
| 10 | N = 2 | N = 4 |
| 11 | — | — |

Optionally, in the implementation of the present disclosure, the time domain resource reported for the first time may be determined according to the content included in the first CSI reported for the first time, which may be understood as: for a case in which the content reported every time is not always the same, time when each content is reported for the first time may be determined, and corresponding content may be reported for the first time according to the time. For example, still as shown in Table 1, assuming that the terminal device needs to report CRI, and report RI, PMI, and CQI, then starting time for reporting CRI for the first time and starting time for reporting RI, PMI, and CQI for the first time may be determined according to the shown in Table 1.

Optionally, the terminal device persistently reports the first CSI to the network device on persistent time domain resource units for uplink transmission; or, reports the first CSI to the network device periodically with a certain period.

Optionally, for the first CSI with different contents, reporting periods may be different, and/or sizes of a resource occupied by each reporting may be different.

Optionally, the activation signaling includes third information for indicating a resource for reporting the first CSI. For example, a period for reporting the first CSI, a size of a resource occupied by each feedback, time domain offsets of feedback of CSI with different contents, etc. On the resource indicated by the third information, the first CSI is persistently reported to the network device.

Optionally, in the implementation of the present disclosure, the terminal device may determine the first CSI reported each time according to a dependency relationship among CSI measurement, and report the first CSI.

In one implementation, the measurement of the first CSI reported each time does not depend on the first CSI reported at other times.

For example, CSI reported each time is CSI corresponding to one CSI process, and CSI corresponding to different CSI processes is not carried in one reporting.

For example, CSI reported each time is CSI obtained by the same measurement resource, and CSI obtained by different measurement resources is not carried in one reporting.

For example, CSI reported each time is CSI obtained based on an assumption of the same downlink transmission (an assumption of a downlink transmission beam of CSI-RS), and CSI obtained based on different assumptions of downlink beams is not carried in one reporting.

In another implementation, the first CSI for which measurement has a dependency relationship is reported on persistent reporting resources.

For example, when CSI corresponding to codebooks of different levels is reported, CSI corresponding to pre-coding information W1 may be reported on a previous reporting resource, and CSI corresponding to pre-coding information W2 and W3 may be reported on subsequent reporting resources. Herein W2 and W3 are calculated based on W1, and complete pre-coding information may be obtained by W1, W2, and W3.

Optionally, the activation signaling includes fourth information for indicating a dependency relationship among measurement for the first CSI reported at various times; and the terminal device determines the first CSI to be reported each time according to the dependency relationship among CSI measurement and the fourth information, and reports the first CSI.

Optionally, in the implementation of the present disclosure, CSI for which measurement has a dependency relationship may be divided into the same CSI group, and CSI for which measurement does not have a dependency relationship may be divided into different CSI groups. That is, one CSI group includes at least one CSI content, and different CSI groups are independent, but the CSI content(s) within a CSI group are interrelated (i.e., a CSI content needs to be calculated based on another CSI content, or two CSI contents need to be calculated based on the same resource). Then different CSI contents in one group may be reported on persistent reporting resources, or all contents in one group may be reported on the same reporting resource.

Optionally, the terminal device receives a first DCI signaling for scheduling a transmission of uplink data; according to the first DCI signaling, the terminal device determines that transmission of the uplink data needs to be performed in a first time domain resource unit in which the first CSI is persistently reported; and in the first time domain resource unit, the first CSI is reported to the network device by multiplexing with the uplink data.

Specifically, if the terminal device receives DCI for scheduling the transmission of uplink data by the network device in a certain time domain resource unit during persistent CSI feedback, the CSI to be fed back in the time domain resource unit and the uplink data to be transmitted are multiplexed and then transmitted based on the DCI. CSI reporting is still performed according to an original configuration of persistent CSI reporting after this time domain resource unit.

Optionally, the terminal device may perform multiplexing of uplink data and CSI only under a Multiple Access manner of Discrete Fourier transform Orthogonal Frequency Division Multiplexing based Spread Spectrum (DFT-S-OFDM); and transmit the CSI and uplink data independently under a Multiple Access manner of Cyclic Prefix Orthogonal Frequency Division Multiplexing (CP-OFDM). At this time, in a first time domain resource unit, the terminal device may suspend the transmission of the first CSI; or, regardless of which uplink multiple access manner is adopted, the terminal device may multiplex the uplink data and the CSI.

In this case, the network device may obtain the CSI and the uplink data reported by the terminal device in the first time domain resource unit based on a configuration of the DCI.

Therefore, in the implementation of the present disclosure, the CSI is reported through a PUSCH and multiplexed with burst data transmission, which may improve a utilization rate of a resource and support greater feedback signaling overhead.

Optionally, the terminal device receives a second DCI signaling for scheduling aperiodic CSI reporting; the terminal device determines according to the second DCI signaling that the aperiodic CSI reporting needs to be performed in a second time domain resource unit in which the first CSI is persistently reported; and performs the aperiodic CSI reporting based on the second DCI signaling, and suspends persistent reporting of the first CSI in the second time domain resource unit.

Specifically, if the terminal device receives DCI for scheduling aperiodic CSI reporting by the network device in a certain time domain resource unit during persistent CSI feedback, CSI reporting in the time domain resource unit is performed based on configuration information of the DCI. In the time domain resource unit, the first CSI may be reported in the aperiodic CSI, or no first CSI may be reported directly. CSI reporting is still performed according to an original configuration of persistent CSI reporting after this time domain resource unit.

In this case, the network device may obtain CSI reported by the terminal device in a second time domain resource unit based on the configuration of the DCI.

Therefore, the reporting of persistently CSI is suspended when it is needed to report aperiodic CSI, and the reporting of the persistently CSI is performed after the aperiodic CSI is reported, thereby a diversity of CSI reporting may be realized, and communication requirements may be satisfied better.

Figure 3:
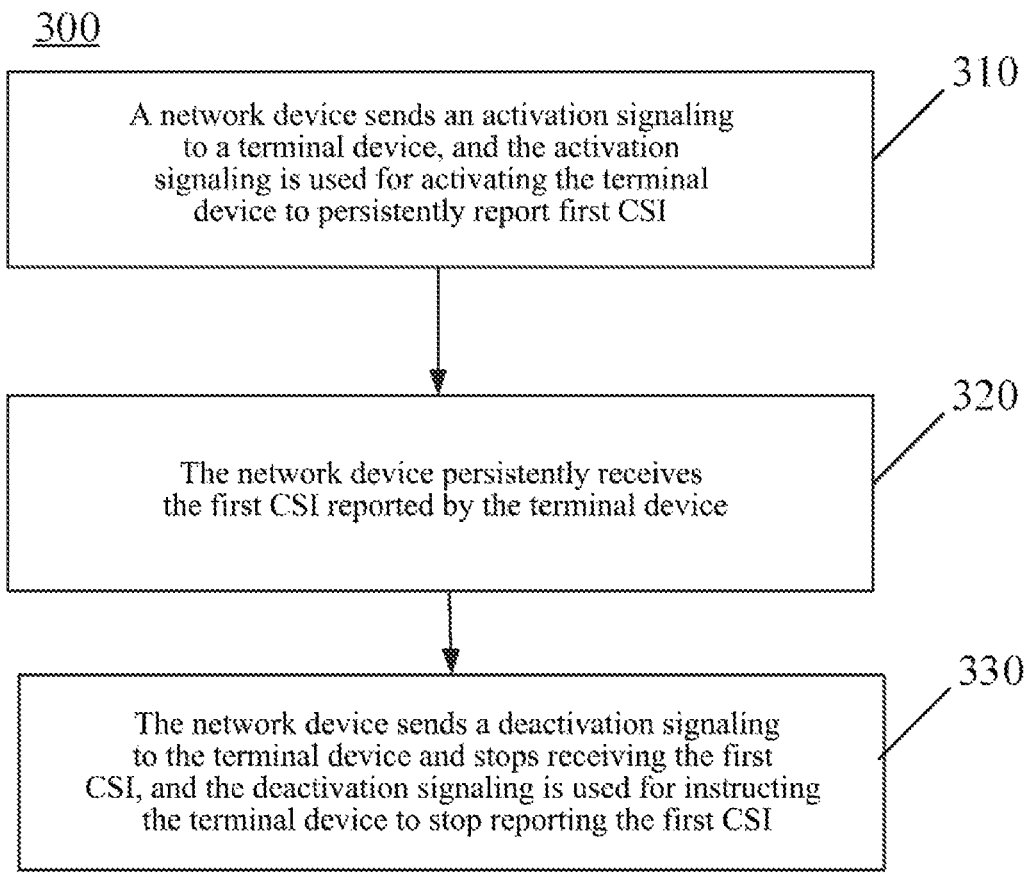
FIG. 3 is a schematic flowchart of a wireless communication method according to an implementation of the present disclosure.

FIG. 3 is a schematic flowchart of a wireless communication method 300 according to an implementation of the present disclosure. As shown in FIG. 3, the method 300 includes the following contents.

In 310, a network device sends an activation signaling to a terminal device, and the activation signaling is used for activating the terminal device to persistently report first CSI.

In 320, the network device persistently receives the first CSI reported by the terminal device.

In 330, the network device sends a deactivation signaling to the terminal device and stops receiving the first CSI, and the deactivation signaling is used for instructing the terminal device to stop reporting the first CSI.

Optionally, the network device persistently receives the first CSI through a physical uplink shared channel (PUSCH) or a physical uplink control channel (PUCCH).

Optionally, the first CSI includes at least one of: CRI, RI, PMI, CQI, a quantized value of channel information, and a quantized value of interference.

Optionally, the first CSI includes CRI, and the network device obtains beam information of downlink beam-forming for downlink scheduling according to the CRI.

Specifically, downlink scheduling may include downlink pre-coding, and downlink pre-coding may be performed according to the beam information of downlink beam-forming.

Optionally, when the first CSI includes RI, PMI, and CQI, the network device schedules downlink data for the terminal device according to the RI, the PMI, and the CQI.

Optionally, when the first CSI includes RI and CQI, the network device schedules downlink data for the terminal device according to the RI and the CQI.

Optionally, the activation signaling includes at least one of first information, second information, third information, and fourth information. Herein, the first information is used for indicating content included in the first CSI; the second information is used for indicating time when the first CSI is reported for a first time; the third information is used for indicating a resource for reporting the first CSI; the fourth information is used for indicating a dependency relationship among measurement for the first CSI reported at various times.

It should be understood that the network device in the method 300 may implement the corresponding functions implemented by the terminal device mentioned in the method 200, which will not be described in detail herein for the sake of brevity.

Therefore, in the implementation of the present disclosure, after the terminal device receives the activation signaling sent by the network device for activating the terminal device to persistently report the first CSI, the terminal device persistently reports the first CSI to the network device until receiving the deactivation signaling sent by the network device for instructing the terminal device to stop reporting the first CSI. Therefore, since CSI reporting is persistently performed, the network device may obtain enough CSI, scheduling quality may be improved, and the communication performance may be improved. In addition, starting and ending of the CSI reporting may be triggered based on the activation signaling and the deactivation signaling, so that CSI may be obtained on demand, and the communication performance may be further improved.

Figure 4:
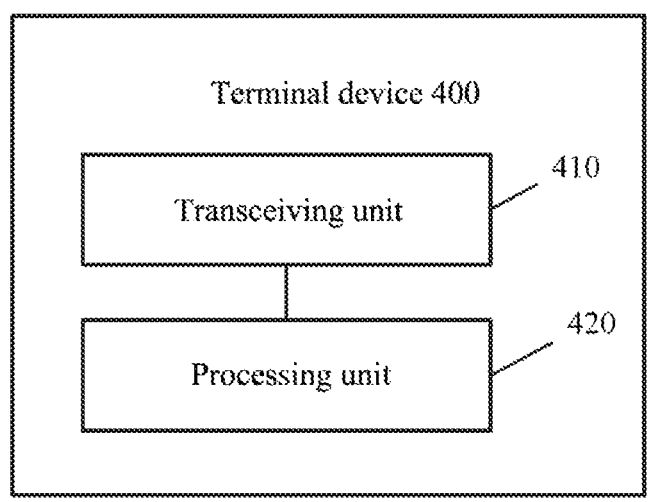
FIG. 4 is a schematic block diagram of a terminal device according to an implementation of the present disclosure.

FIG. 4 is a schematic block diagram of a terminal device 400 according to an implementation of the present disclosure. As shown in FIG. 4, the terminal device 400 includes a transceiving unit 410 and a processing unit 420.

The transceiving unit 410 is used for receiving an activation signaling sent by a network device, wherein the activation signaling is used for activating the terminal device to persistently report first CSI.

The processing unit 420 is used for obtaining the first CSI after receiving the activation signaling.

The transceiving unit 410 is used for persistently reporting the first CSI to the network device until receiving a deactivation signaling sent by the network device, wherein the deactivation signaling is used for instructing the terminal device to stop reporting the first CSI.

Optionally, the transceiving unit 410 is further used for persistently reporting the first CSI to the network device through a physical uplink shared channel (PUSCH) or a physical uplink control channel (PUCCH).

Optionally, the first CSI includes at least one of: a channel state information reference signal resource indicator (CRI), a rank indicator (RI), a pre-coding matrix indicator (PMI), channel quality information (CQI), a quantized value of channel information, and a quantized value of interference.

Optionally, the transceiving unit 410 is further used for performing persistent CSI measurement to obtain the first CSI.

Optionally, the transceiving unit 410 is further used for determining at least one of the following according to content included in the first CSI, and performing the persistent CSI measurement according to the at least one of the following to obtain the first CSI: a resource for performing the persistent CSI measurement, a quantity of CSI-RS ports used for performing the persistent CSI measurement, and an assumption of a CSI-RS transmission beam on the resource for performing the CSI measurement.

Optionally, the transceiving unit 410 is further used for determining a first time domain resource for reporting the first CSI for a first time according to content included in the first CSI; and reporting the first CSI for the first time on the first time domain resource.

Optionally, the activation signaling includes first information for indicating content included in the first CSI.

The transceiving unit 410 is further used for reporting persistently the first CSI to the network device according to the first information, wherein the first CSI includes the content indicated by the first information.

Optionally, the activation signaling includes second information for indicating time when the first CSI is reported for a first time.

The transceiving unit 410 is further used for determining a second time domain resource for reporting the first CSI for the first time according to the second information, and reporting the first CSI to the network device for the first time on the second time domain resource.

Optionally, the activation signaling includes third information for indicating a resource for reporting the first CSI.

The transceiving unit 410 is further used for reporting persistently the first CSI to the network device on the resource indicated by the third information.

Optionally, the transceiving unit 410 is further used for reporting persistently the first CSI to the network device on persistent time domain resource units for uplink transmission; or reporting the first CSI to the network device periodically with a certain period.

Optionally, the processing unit 420 is further used for determining the first CSI reported each time according to a dependency relationship among CSI measurement.

Optionally, measurement of the first CSI reported each time does not depend on the first CSI reported at other times; or, the first CSI for which measurement has a dependency relationship is reported on persistent reporting resources.

Optionally, the activation signaling includes fourth information for indicating a dependency relationship among measurement for the first CSI reported at various times.

Optionally, the transceiving unit 410 is further used for reporting persistently the first CSI to the network device by adopting at least one of the following manners: a same Multiple Input Multiple Output (MIMO) transmission mode, a same modulation coding manner, a same quantity of orthogonal frequency division multiplexing symbols, and a same frequency domain resource.

Optionally, the transceiving unit 410 is further used for receiving a first DCI signaling for scheduling a transmission of uplink data.

The processing unit 420 is further used for determining according to the first DCI signaling that the transmission of the uplink data needs to be performed in a first time domain resource unit in which the first CSI is persistently reported.

The transceiving unit 410 is further used for reporting the first CSI to the network device by multiplexing with the uplink data in the first time domain resource unit.

Optionally, the transceiving unit 410 is further used for receiving a second DCI signaling for scheduling aperiodic CSI reporting.

The processing unit is further used for determining according to the second DCI signaling that the aperiodic CSI reporting needs to be performed in a second time domain resource unit in which the first CSI is persistently reported.

The transceiving unit 410 is further used for performing the aperiodic CSI reporting based on the second DCI signaling, and suspending persistent reporting of the first CSI in the second time domain resource unit.

Optionally, the activation signaling and deactivation signaling are a DCI signaling or a MAC signaling.

It should be understood that the terminal device 400 may correspond to the terminal device in the method 200 and may realize the corresponding functions of the network device. For the sake of brevity, the specific description will not be repeated here.

Figure 5:
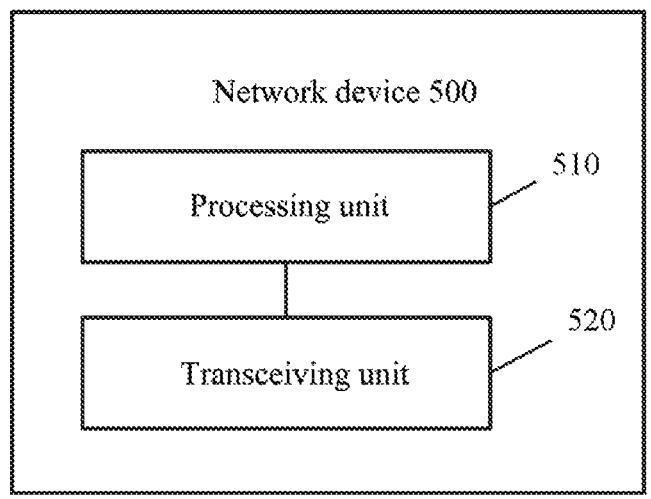
FIG. 5 is a schematic block diagram of a network device according to an implementation of the present disclosure.

FIG. 5 is a schematic block diagram of a network device 500 according to an implementation of the present disclosure. As shown in FIG. 5, the network device 500 includes a processing unit 510 and a transceiving unit 520.

Herein, the processing unit 510 is used for generating an activation signaling and a deactivation signaling.

The transceiving unit 520 is used for sending the activation signaling to a terminal device, wherein the activation signaling is used for activating the terminal device to persistently report first CSI; persistently receiving the first CSI reported by the terminal device; sending a deactivation signaling to the terminal device and stopping receiving the first CSI, wherein the deactivation signaling is used for instructing the terminal device to stop reporting the first CSI.

Optionally, the transceiving unit 520 is further used for receiving, by the network device, persistently the first CSI through a physical uplink shared channel (PUSCH) or a physical uplink control channel (PUCCH).

Optionally, the first CSI includes at least one of: a channel state information reference signal resource indicator (CRI), a rank indicator (RI), a pre-coding matrix indicator (PMI), channel quality information (CQI), a quantized value of channel information, and a quantized value of interference.

Optionally, the processing unit 510 is further used for obtaining beam information of downlink beam-forming according to CRI when the first CSI includes the CRI; or, scheduling downlink data for the terminal device according to RI, PMI, and CQI when the first CSI includes the RI, the PMI, and the CQI; or, scheduling downlink data for the terminal device according to RI and CQI when the first CSI includes the RI and the CQI.

Optionally, the activation signaling includes at least one of first information, second information, third information, and fourth information. Herein, the first information is used for indicating content included in the first CSI; the second information is used for indicating time when the first CSI is reported for a first time; the third information is used for indicating a resource for reporting the first CSI; and the fourth information is used for indicating a dependency relationship among measurement for the first CSI reported at various times.

It should be understood that the network device 500 may correspond to the network device in the method 300, and may realize the corresponding functions of the network device, which will not be described in detail herein for the sake of brevity.

Figure 6:
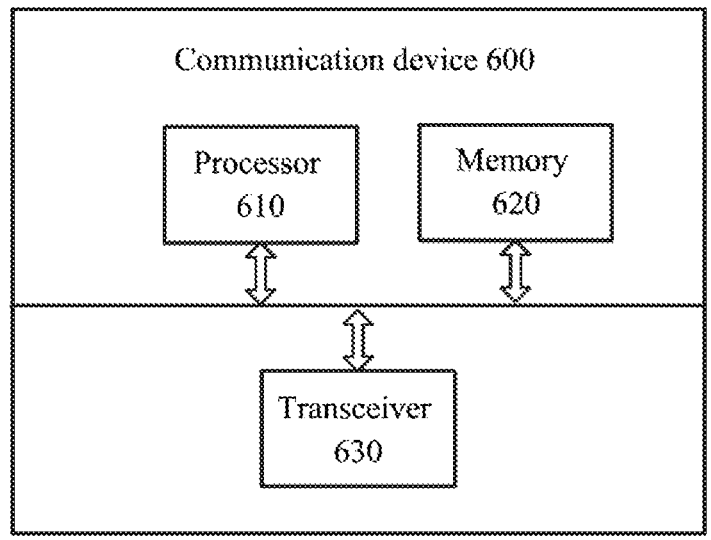
FIG. 6 is a schematic block diagram of a communication device according to an implementation of the present disclosure.

FIG. 6 is a schematic block diagram of a communication device 600 according to an implementation of the present disclosure. As shown in FIG. 6, the communication device 600 includes a processor 610 and a memory 620. The memory 620 may store program codes, and the processor 610 may execute the program codes stored in the memory 620.

Optionally, as shown in FIG. 6, the communication device 600 may include a transceiver 630, and the processor 610 may control the transceiver 630 to communicate with the external.

Optionally, the processor 610 may call the program codes stored in the memory 620 to perform corresponding operations of the terminal device in the method 200 shown in FIG. 2, which will not be described here repeatedly for brevity.

Optionally, the processor 610 may call the program codes stored in the memory 620 to perform corresponding operations of the network device in the method 300 shown in FIG. 3, which will not be described here repeatedly for brevity.

Figure 7:
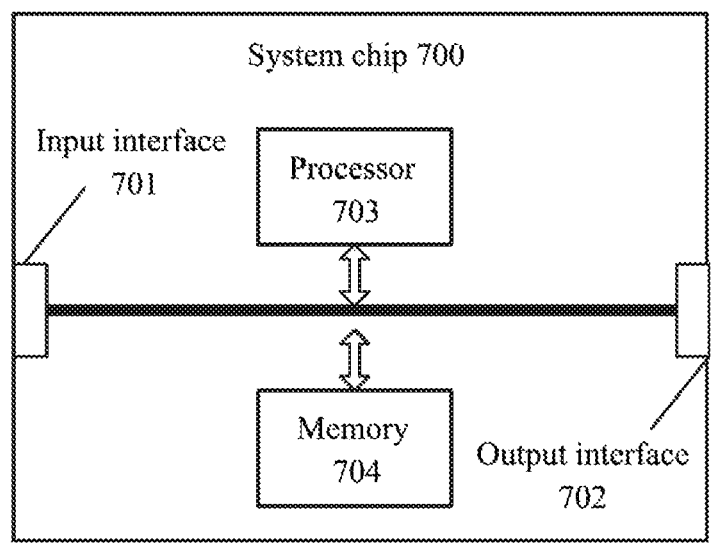
FIG. 7 is a schematic block diagram of a system chip according to an implementation of the present disclosure.

FIG. 7 is a schematic structural diagram of a system chip 700 according to an implementation of the present disclosure. The system chip 700 of FIG. 7 includes an input interface 701, an output interface 702, a processor 703, and a memory 704. The processor 703 and the memory 704 are connected by a communication connection, and the processor 703 is used for executing codes in the memory 704.

Optionally, when the codes are executed, the processor 703 implements the method executed by the terminal device in the method 200 shown in FIG. 2. For sake of conciseness, the specific description will not be repeated here.

Optionally, when the codes are executed, the processor 703 implements the method executed by the network device in the method 300 shown in FIG. 3. For sake of conciseness, the specific description will not be repeated here.

Those of ordinary skill in the art will recognize that the exemplary units and algorithm acts described in connection with the implementations disclosed herein may be implemented in electronic hardware, or a combination of computer software and electronic hardware. Whether these functions are implemented in hardware or software depends on a specific application and design constraint of the technical solution. Skilled in the art may use different manners to realize the described functions for each particular application, but such realization should not be considered to be beyond the scope of the present disclosure.

Those skilled in the art may clearly understand that for convenience and conciseness of description, the specific working process of the system, device and unit described above may refer to the corresponding process in the aforementioned implementations of methods, and details are not described herein again.

In several implementations provided by the present disclosure, it should be understood that the disclosed system, device and method may be implemented in other ways. For example, the apparatus implementations described above are only illustrative, for another example, the division of the units is only a logical function division, and there may be other division manners in actual realization. For still another example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The units described as separated components may or may not be physically separated, and the component shown as a unit may or may not be a physical unit, i.e., it may be located in one place or may be allocated over multiple network units. Some or all of the units may be selected according to practical needs to achieve a purpose of the solution of the implementations.

In addition, various functional units in various implementations of the present disclosure may be integrated in one processing unit, or various units may be physically present separately, or two or more units may be integrated in one unit.

The functions may be stored in a computer readable storage medium if implemented in a form of a software functional unit and sold or used as a separate product. Based on this understanding, the technical solution of the present disclosure, in essence, or the part contributing to the existing art, or the part of the technical solution, may be embodied in the form of a software product stored in a storage medium, including several instructions for causing a computer device (which may be a personal computer, a server, or a network device, etc.) to perform all or part of the acts of the methods described in various implementations of the present disclosure.

The aforementioned storage media include U disk, mobile hard disk, read-only memory (ROM), random access memory (RAM), magnetic disk or optical disk, and other media capable of storing program codes.

The foregoing are merely exemplary implementations of the present disclosure, but the protection scope of the present disclosure is not limited thereto. Any person skilled in the art may easily conceive variations or substitutions within the technical scope disclosed by the present disclosure, which should be included within the protection scope of the present disclosure. Therefore, the protection scope of the present disclosure should be subject to the protection scope of the claims.

The invention claimed is:

1. A method for wireless communication, comprising:
   receiving, by a terminal device, an activation signaling sent by a network device, wherein the activation signaling is used for activating the terminal device to persistently report first channel state information (CSI), and the activation signaling comprises first information for indicating content being included in the first CSI; and
   reporting, by the terminal device, persistently the first CSI to the network device after receiving the activation signaling until the terminal device receives a deactivation signaling sent by the network device, wherein the deactivation signaling is used for instructing the terminal device to stop reporting the first CSI,
   wherein the method further comprises:
   determining, by the terminal device, an assumption of a CSI-RS transmission beam on the resource for performing the CSI measurement according to the content being included in the first CSI, and performing, by the terminal device, persistent CSI measurement based on the assumption of the CSI-RS transmission beam on the resource for performing the CSI measurement to obtain the first CSI.

2. The method according to claim 1, wherein the reporting, by the terminal device, persistently the first CSI to the network device, comprises:
   reporting, by the terminal device, persistently the first CSI to the network device through a physical uplink shared channel (PUSCH) or a physical uplink control channel (PUCCH).

3. The method according to claim 1, wherein the first CSI comprises at least one of:
   a channel state information reference signal resource indicator (CRI), a rank indicator (RI), a pre-coding matrix indicator (PMI), channel quality information (CQI), a quantized value of channel information, and a quantized value of interference.

4. The method according to claim 3, wherein the performing, by the terminal device, the persistent CSI measurement to obtain the first CSI, further comprises:
   determining, by the terminal device, at least one of the following according to the content being included in the first CSI, and performing the persistent CSI measurement according to the at least one of the following to obtain the first CSI:
   a resource for performing the persistent CSI measurement, or a quantity of channel state information reference signal (CSI-RS) ports used for performing the persistent CSI measurement.

5. The method according to claim 1, wherein
   the reporting, by the terminal device, persistently the first CSI to the network device, comprises:
   reporting, by the terminal device, persistently the first CSI to the network device according to the first information.

6. The method according to claim 1, wherein the activation signaling comprises second information, and the second information is used for indicating a second time domain resource when the first CSI is reported for a first time; and
   the reporting, by the terminal device, persistently the first CSI to the network device, comprises:
   determining, by the terminal device, a second time domain resource for reporting the first CSI for the first time according to the second information, and reporting the first CSI to the network device for the first time on the second time domain resource.

7. The method according to claim 6, wherein the method further comprises:
   determining, by the terminal device, time domain resources for subsequent persistent reporting of the first CSI according to the second time domain resource for reporting the first CSI for the first time and a period obtained in advance for reporting persistently the first CSI.

8. The method according to claim 1, wherein the activation signaling comprises third information for indicating a resource for reporting the first CSI; and
   the reporting, by the terminal device, persistently the first CSI to the network device, comprises:
   reporting, by the terminal device, persistently the first CSI to the network device on the resource indicated by the third information.

9. The method according to claim 1, wherein the reporting, by the terminal device, persistently the first CSI to the network device, comprises:
   reporting, by the terminal device, persistently the first CSI to the network device on persistent time domain resource units for uplink transmission; or
   reporting, by the terminal device, the first CSI to the network device periodically with a certain period.

10. The method according to claim 1, wherein the reporting, by the terminal device, persistently the first CSI to the network device, comprises:
    determining, by the terminal device, the first CSI reported each time according to a dependency relationship among CSI measurement, and reporting the first CSI.

11. The method according to claim 1, wherein the reporting, by the terminal device, persistently the first CSI to the network device, comprises:
    reporting, by the terminal device, persistently the first CSI to the network device by adopting at least one of: a same Multiple Input Multiple Output (MIMO) transmission mode, a same modulation coding manner, a same quantity of orthogonal frequency division multiplexing symbols, and a same frequency domain resource.

12. The method according to claim 1, wherein the activation signaling and deactivation signaling are a DCI signaling or a media access control (MAC) signaling.

13. A terminal device, comprising a transceiver and a processor; wherein,
    the transceiver is used for receiving an activation signaling sent by a network device, wherein the activation signaling is used for activating the terminal device to persistently report first channel state information (CSI), and the activation signaling comprises first information for indicating content being included in the first CSI;
    the processor is used for obtaining the first CSI after receiving the activation signaling;

the transceiver is further used for persistently reporting the first CSI to the network device until receiving a deactivation signaling sent by the network device, wherein the deactivation signaling is used for instructing the terminal device to stop reporting the first CSI; and the transceiver is further used for determining an assumption of a CSI-RS transmission beam on the resource for performing the CSI measurement according to the content being included in the first CSI, and performing the persistent CSI measurement according to the assumption of the CSI-RS transmission beam on the resource for performing the CSI measurement to obtain the first CSI.

14. The terminal device according to claim 13, wherein the transceiver is further used for:

persistently reporting the first CSI to the network device through a physical uplink shared channel (PUSCH) or a physical uplink control channel (PUCCH).

15. The terminal device according to claim 13, wherein the first CSI comprises at least one of:

a channel state information reference signal resource indicator (CRI), a rank indicator (RI), a pre-coding matrix indicator (PMI), channel quality information (CQI), a quantized value of channel information, and a quantized value of interference.

16. The terminal device according to claim 13, wherein the transceiver is further used for:

determining at least one of the following according to the content being included in the first CSI, and performing the persistent CSI measurement according to the at least one of the following to obtain the first CSI:

a resource for performing the persistent CSI measurement, or a quantity of channel state information reference signal (CSI-RS) ports used for performing the persistent CSI measurement.

17. The terminal device according to claim 13, wherein the transceiver is further used for:

reporting persistently the first CSI to the network device according to the first information.

18. The terminal device according to claim 13, wherein the activation signaling comprises second information, and the second information is used for indicating a second time domain resource when the first CSI is reported for a first time;

the processor is further used for:

determining a second time domain resource for reporting the first CSI for the first time according to the second information; and the transceiver is further used for:

reporting the first CSI to the network device for the first time on the second time domain resource.

19. The terminal device according to claim 18, wherein the transceiver is further used for determining time domain resources for subsequent persistent reporting of the first CSI according to the second time domain resource for reporting the first CSI for the first time and a period obtained in advance for reporting persistently the first CSI.

20. The terminal device according to claim 13, wherein the activation signaling comprises third information for indicating a resource for reporting the first CSI; and the transceiver is further used for:

reporting persistently the first CSI to the network device on the resource indicated by the third information.

21. The terminal device according to claim 13, wherein the transceiver is further used for:

reporting persistently the first CSI to the network device on persistent time domain resource units for uplink transmission; or reporting the first CSI to the network device periodically with a certain period.

22. The terminal device according to claim 13, wherein the processor is further used for:

determining the first CSI reported each time according to a dependency relationship among CSI measurement.

23. The terminal device according to claim 13, wherein the transceiver is further used for:

reporting persistently the first CSI to the network device by adopting at least one of: a same Multiple Input Multiple Output (MIMO) transmission mode, a same modulation coding manner, a same quantity of orthogonal frequency division multiplexing symbols, and a same frequency domain resource.

24. The terminal device according to claim 13, wherein the activation signaling and deactivation signaling are a DCI signaling or a media access control (MAC) signaling.

* * * * *